J. W. H. DEW.
TIRE WRAPPING MACHINE.
APPLICATION FILED OCT. 11, 1913.

1,116,806.

Patented Nov. 10, 1914.

2 SHEETS—SHEET 1.

Witnesses.

Inventor.

James W. H. Dew
by Herbert W. Jenner
Attorney

J. W. H. DEW.
TIRE WRAPPING MACHINE.
APPLICATION FILED OCT. 11, 1913.

1,116,806.

Patented Nov. 10, 1914.
2 SHEETS—SHEET 2.

Witnesses

Inventor
James W. H. Dew
by Herbert W. Jenner
Attorney.

UNITED STATES PATENT OFFICE.

JAMES WALTER HENRY DEW, OF LONDON, ENGLAND.

TIRE-WRAPPING MACHINE.

1,116,806.  Specification of Letters Patent.  Patented Nov. 10, 1914.

Application filed October 11, 1913. Serial No. 794,697.

*To all whom it may concern:*

Be it known that I, JAMES WALTER HENRY DEW, subject of the King of Great Britain and Ireland, and resident of London, E. C., in the county of London, England, have invented certain new and useful Improvements in Tire-Wrapping Machines, of which the following is a specification.

My invention relates to improvements in machinery for manufacturing the outer covers of pneumatic tires and like articles and has reference to that type of machine in which a fixed gapped frame is employed to support a rotatable gapped ring carrying a reel or reels supplied with narrow fabrics or the like, such gapped frame and ring allowing the passage therewith of a core or mandrel upon which the narrow material is to be wound by the combined rotation of the gapped ring and mandrel, the object of my invention being to provide improvements in the general construction and arrangement of such machines including specific and novel arrangements of certain parts all particularly adapted for the manufacture of outer covers or tires in which the foundations or casings are composed of fabric or equivalent material in the form of strips or ribbons wound around a mandrel or core at an angle thereto so that the strips may be crossed first in one direction and then in the other to the thickness of casing required.

My invention comprises a machine in which the aforesaid strips are wound around a mandrel of an irregular oval or other suitable cross section; means for positively driving the mandrel or core, means for cutting the casing so that it can be doubled or opened up to make the beaded edges of a tire cover where such is necessary; means for supporting the mandrel or core; means for holding and winding the strips of material around the mandrel and other features which will be hereinafter more fully described.

My invention will be fully described with reference to the accompanying drawings in which—

Figure 1:
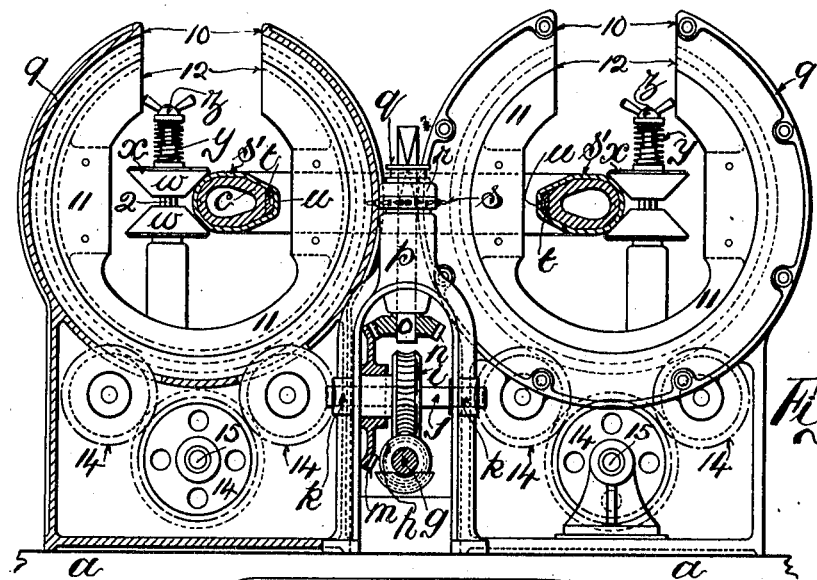
Figure 2:
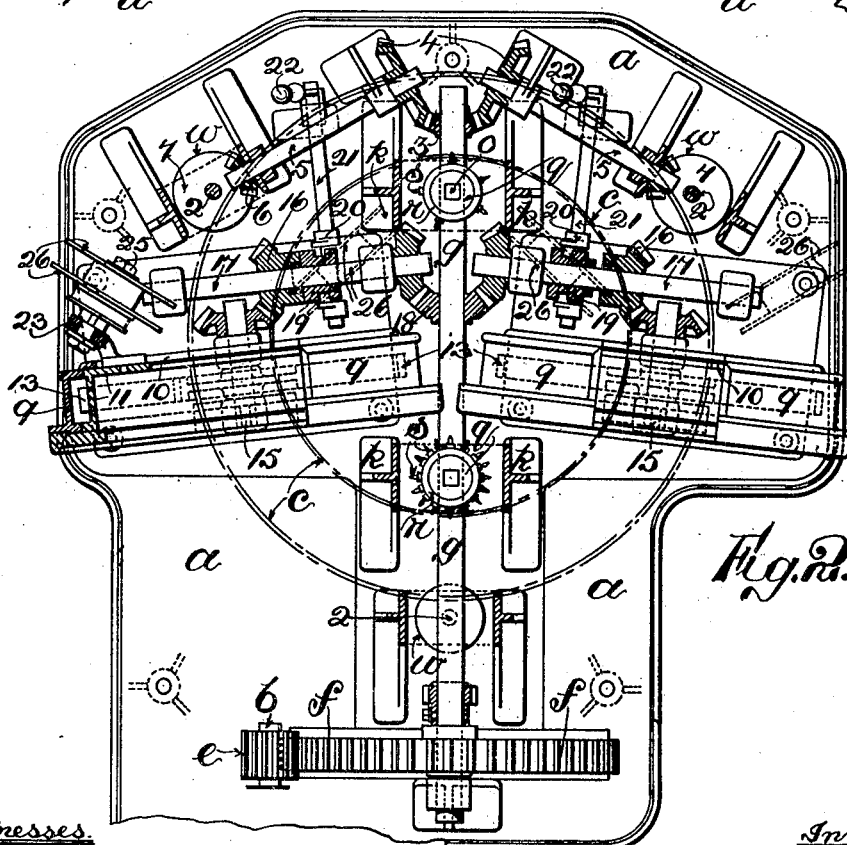
Figure 3:
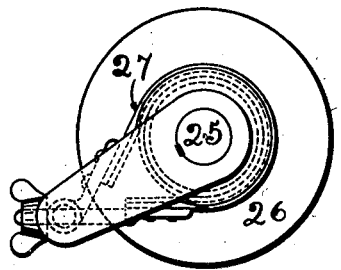
Figure 4:
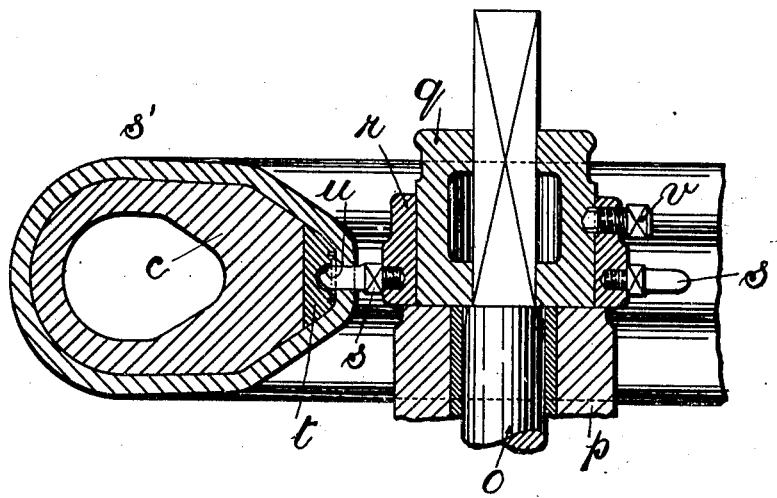

Figure 1 is a front elevation of the machine, partly in section, Fig. 2 is a plan, partly in section, Fig. 3 is an elevation of one of the strip-carrying drums, showing the braking arrangement and Fig. 4 is a sectional elevation showing the driving connection with the mandrel.

In accordance with my invention I construct the machine with a suitable bed $a$ adapted to support the various mechanical motions forming the complete machine. On this bed I mount a driving shaft $b$ adapted to communicate motion from a suitable power source by means of bevel, spur, worm, and wheel or other suitable gear to the various parts of the machine and this shaft may be further fitted, if desired, with change speed gear, a speed cone or other means by which the speed of the driving shaft may be increased or decreased at will. In one motion the driving shaft transmits motion to a mandrel or core $c$ of irregular oval or other suitable cross section around which the strip to form the casing of the tire cover or the like is to be wound.

According to one of the arrangements for driving the mandrel, the power shaft $b$ has a pinion $e$ gearing with wheel $f$ fixed on shaft $g$ which constitutes the main shaft of the machine from which the various motions are driven. To drive the mandrel this last named shaft $g$ carries worms $h$ driving worm wheels $i$ fixed on shafts $j$ supported in bearings $k$, such shafts or the worm wheel bosses carrying bevel wheels $m$ that, in turn drive bevel pinions $n$ fixed on shafts $o$ supported in bearings $p$. The upper ends of the shafts $o$ project beyond the bearings in squared form and have loosely mounted upon them bosses $q$ on which, in turn, (see Fig. 4) are mounted sprocket wheel rings $r$ provided with teeth $s$ so formed or pointed at the ends as to constitute cutters or perforators adapted to pierce the strip of material $s^1$ wound around the mandrel $c$ and at the same time drive the latter. To enable this to be effected the mandrel $c$ is provided with an inner portion or with a ring $t$ connected to it at its inner side having a number of sprocket holes $u$ by means of which it is driven through the agency of the teeth $s$ just referred to. Each sprocket ring $r$, during driving, is fixed to the boss $q$ by a set screw $v$, key or by any other simple form of connection so that the wheel is adapted to rise on its shaft $o$ while turning with it as the thickness of the wound strip $s^1$ increases and as the mandrel consequently rises from the original position. Further by means of mounting the sprocket wheel on an axially slidable boss such as $q$ which can at one time be fixed to it and at another time be disengaged therefrom, the wheel with its teeth can be slid laterally away from the mandrel out of action. In the arrangement shown the setscrews are disengaged and the slidable bosses $q$ lifted up out of the sprocket rings $r$ when the latter can be moved laterally to disengage their teeth from the mandrel $c$.

The mandrel $c$ is supported on or between conical rollers or pulleys $w$ made in two halves, that is to say, to present a V groove between them. The upper half $x$ of each pulley is pressed in the direction of the mandrel by a spring $y$ which can be adjusted to any suitable pressure by a wing nut $z$ and so resist the thickening of the tape winding and thus keep the mandrel down to its work. Any other suitable arrangement to allow of resilient pressure on the upper halves $x$ of the pulleys may be employed. The upper half pulleys $x$ are removable to enable the mandrel to be placed in and taken out of position and they and their bottom halves are positively driven from their shafts 2. Three pulleys $w$ are arranged so as to support the mandrel at that number of points. The shafts 2 carrying the V pulleys are driven positively but the pulleys themselves drive the mandrel $c$ by friction. In other words they act as subsidiary drivers to the sprocket wheels $r$ but can slip as required. The shaft supporting each pulley may be divided by a transverse joint and one part be pivoted to the other so that when the pulleys are in actual use the shaft is kept rigid by virtue of the pulley or a portion of it crossing the joint. On the other hand when it is desired to place the mandrel in position the upper half of each pulley may be lifted up beyond the joint in the shaft and allow the latter to be turned to one side away from the mandrel. The same effect may be obtained by pivoting the shaft of each pulley at a point below the latter, means being employed to keep the shafts in proper position during the normal working of the machine.

In the drawings shown the shafts 2 carrying the pulleys $w$ are driven from the shaft $g$ by bevel wheels 3 gearing with corresponding wheels 4 on shafts 5 which have at their opposite ends bevel pinions 6 gearing with wheels 7 on the lower ends of shafts 2. By these means the mandrel is driven frictionally, the positive drive being through the agency of the sprocket wheel mechanism previously described. The friction drive assists the latter and is likewise available when the tire cover is being cut circumferentially on its inner face as afterward explained, at which time the sprocket wheels $r$, are out of action.

In conjunction with the means for driving the mandrel $c$ or as means separate therefrom I employ a cutter device which may be in the form of a circular cutter mounted in a suitable position and adapted to be brought into contact with the inner edge of the casing $s^1$ after the strips have been fully wound for the purpose of severing such casing and allowing the severed edges to be turned over upon themselves for the purpose of forming the beaded edges of the tire cover. This cutter may be brought into operation at the finish of the winding or it or another cutter may be brought into cutting position when the strips have been partially wound for the purpose of severing the casing partially. It should be said in this connection that the strips to be wound by the machine forming the subject of my invention are usually strips having a fibrous warp of textile material with no weft, held together in the form of a ribbon of one or more plies in thickness by a rubber or other solution so that when the strips are wound crosswise as hereinafter explained the solution causes them to adhere together and to remain in position on the mandrel $c$ without displacement after the severing action has taken place.

That portion of the improved machine relating to the carrying and winding of the strips just referred to consists of supporting rings 9 of a rigid character secured to the base $a$ of the machine, each having a gap 10 at a suitable point to enable the mandrel $c$ previously referred to being placed in position on the pulleys $w$. Each of these rigid rings is adapted to support within it a rotatable ring 11 also provided with a gap 12 for the purpose previously referred to. Each rotatable ring carries external spur teeth 13 driven by spur or other suitable gear 14 external to the ring which as to the actual driving connection with the ring itself is in duplicate so that both wheels 14 drive the ring at the same time for the greater part of each revolution while each wheel is, in turn, out of gear with the ring while the gap 12 in the latter is passing it. The center wheels 14 are fixed on shafts 15 driven by bevel gear 16 from shafts 17 which in turn derive their motion from the shaft $g$ through bevel gear 18. The first-named bevels on shafts 17 may have their driving connection with such shafts controlled by clutches 19 operated by forks 20 fixed on rods 21 actuated by hand levers 22 so that the rings 11 may be started and stopped as desired.

The rotatable gear rings 11 carry brackets 23 which support studs 25 on which are mounted the brake control reels 26 carrying the tapes or strips to be wound around the mandrel $c$. The position of each of the driven rings 11 and the reels 26 is at such an angle that the strips are wound around the mandrel $c$ angularly so that when the said strips are crossed as is the case when winding several layers to the required thickness of the casing, the angles of the strips with each other and in relation to the mandrel are the same. The reels 26 are retarded by adjustable brake bands 27 so that the required tension may be put on the strips during winding.

The motion of the various parts is arranged in unison so that correct winding takes place and all the chief mechanical motions of the machine may be put into action or be disengaged by clutch mechanism of suitable type.

In operation the ends of the strips to be wound around the mandrel are first secured to the latter in a suitable way, such mandrel having first been placed in position on the pulleys $w$. The machine is then set in motion and the mandrel rotated at a suitable speed. The gear rings also rotate at a speed with strict relation to that of the mandrel and carry the strip reels around the latter and at the same time cause the strips to be drawn off at a suitable tension. Such strips are wound at an angle to the peripheral surface of the mandrel and the several layers cross each other at an angle to themselves so as to thoroughly incorporate or tie each layer to the other. The several layers adhere firmly to each other as a result of the rubber solution and when a sufficient thickness of casing has been formed, either partially or wholly, such casing is severed at its inner side by the cutters to enable the inner severed edges to be turned back to form the beaded edges of the tire cover and to enable the latter to be removed from the mandrel at the finish of the winding operation or after it has been subjected to any further necessary processes to complete its manufacture.

I am aware it has been previously proposed to wrap strips of fabric around the outer cover of a tire prior to and as an aid to vulcanization, by means of reels revolving around and paying out the material, the cover being meanwhile rotated by suitable mechanism such strips being afterward removed when vulcanization is completed.

What I claim as my invention and desire to secure by Letters Patent is:—

1. In a tire wrapping machine, the combination, with a revoluble mandrel for the strips, and means for supporting the mandrel with the strips wound on it; of a revoluble driving shaft journaled adjacent to one side of the mandrel and a driving wheel carried by the said shaft and provided with teeth which perforate the wound strips and revolve the mandrel and the strips positively.

2. In a tire wrapping machine, the combination, with a revoluble mandrel for the strips, and means for supporting the mandrel with the strips wound on it; of a revoluble driving shaft journaled adjacent to one side of the mandrel, and a wheel mounted to revolve with the said shaft and slidable longitudinally on it and provided with teeth which perforate the wound strips and drive the mandrel and the strips positively.

3. In a tire wrapping machine, the combination, with a revoluble mandrel for the strips, and means for supporting the mandrel with the strips wound on it; of a revoluble driving shaft journaled adjacent to one side of the mandrel, a removable hub mounted to revolve with the said shaft and slidable longitudinally thereon, and a wheel provided with means for securing it to the said hub and having teeth which perforate the wound strips and drive the mandrel and the strips positively.

4. In a tire wrapping machine, the combination, with a revoluble mandrel for the strips provided with a perforated ring on one side, and means for supporting the said parts with the strips wound on them; of a revoluble driving shaft journaled adjacent to the said ring, and a driving wheel carried by the said shaft and provided with teeth which perforate the strips and engage positively with the perforations of the said ring.

5. In a tire winding machine, the combination, with a revoluble mandrel for the strips, friction wheels which support the mandrel with the strips wound on it, and means for revolving the friction wheels so that they assist in revolving the mandrel; of a revoluble driving shaft journaled adjacent to one side of the mandrel, and a driving wheel carried by the said shaft and provided with teeth which perforate the wound strips and revolve the mandrel and the strips positively.

In testimony whereof I have hereunto set my hand in the presence of two witnesses.

JAMES WALTER HENRY DEW.

Witnesses:
  E. BURN,
  PHYLLIS CATTERMOLE.